Inventor:
Joseph W. Thropp.
by his Attorneys,
Howson & Howson

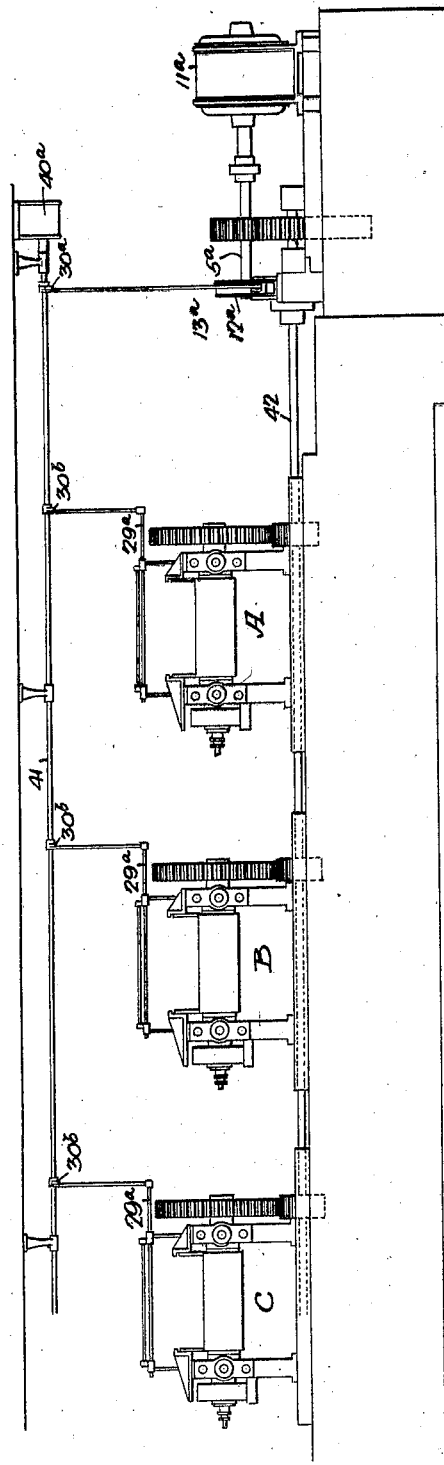

Patented Feb. 27, 1923.

1,447,105

UNITED STATES PATENT OFFICE.

JOSEPH W. THROPP, OF TRENTON, NEW JERSEY.

SAFETY STOP FOR MACHINERY.

Application filed July 7, 1920. Serial No. 394,526.

*To all whom it may concern:*

Be it known that I, JOSEPH W. THROPP, a citizen of the United States, residing in Trenton, Mercer County, New Jersey, have invented certain Improvements in Safety stops for Machinery, of which the following is a specification.

The object of my invention is to provide a mechanical and electrical safety stop for machinery which can be actuated to stop a machine instantly, should an accident occur.

I have illustrated my invention in connection with the mixing rolls of a rubber mill, but it will be understood that my invention can be used in connection with any machine which cannot be properly protected by the ordinary guards.

The invention is especially adapted to be used in connection with machines where exposed rolls are necessary so that in the event of an operator being caught in the rolls, or in the machinery connected therewith, an arm, or a portion of the body, will come in contact with the mechanism, actuating an electric switch and stopping the machine instantly.

In the accompanying drawings:

Fig. 3 is a detached view, showing the brake release mechanism;

Fig. 5 is a view illustrating my invention in connection with a series of machines driven from a single motor.

Figure 1:
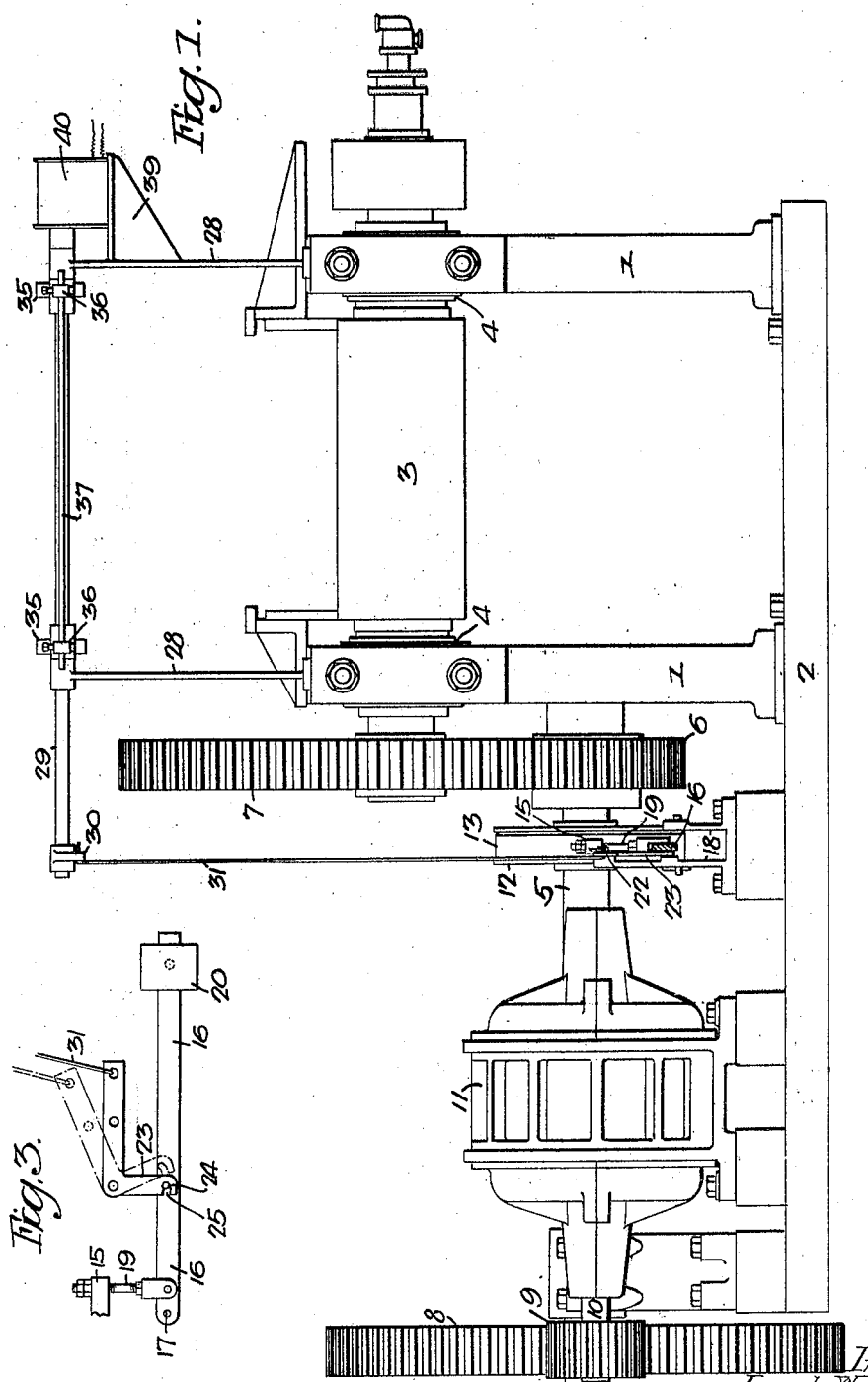
Fig. 1 is a front elevation illustrating my improved safety device in connection with a roller mixing machine.

1, 1 are two housings mounted on a base frame 2. 3, 3 are two rolls adapted to boxes 4 located in the housings. 5 is a shaft having a pinion 6, which meshes with a gear wheel 7 on one of the rollers 3. On this shaft 5 is a gear wheel 8 with which meshes a pinion 9 on a shaft 10 of an electric motor 11. 12 is a brake drum on the shaft 5 and extending around this drum is a brake band 13 connected at one end to a fixed pin 14 and at the opposite end to a movable block 15. 16 is a lever pivoted at 17 to a fixed point on a frame 18 to which the pin 14 is also attached. This lever 16 is connected by an adjustable rod 19 to the block 15 of the brake band. On the outer end of the lever 16 is an adjustable weight 20. Pivoted to the frame 18 at 21 is a bell crank lever 22. One arm 23 of this lever has an open slot 24 into which projects a pin 25 on the lever 16. The arm 26 of the bell crank lever is connected to the frame 18 by a spring 27, which tends to keep the arm 23 in engagement with the pin 25 of the lever 16. As soon as the arm 26 is raised by the safety mechanism, the lever 16 is released and its weight 20 will apply the brake band to the drum 12, stopping the rotation of the shaft 5, the power, in the meantime, having been cut off by the electric switch hereinafter described.

Mounted in the housings 1 are standards 28, on which is mounted a shaft 29. On this shaft is an arm 30 connected by a rod 31 to the arm 26. This shaft 29 extends across the machine from one standard to the other. On this shaft are two arms 32. Extending from one arm 32 to the other is a rod 33. On the shaft 29 is a toothed segment 34, which meshes with a toothed segment 35 on an arm 36 secured to a short shaft 38 journaled in one of the standards 28. This mechanism is preferably duplicated at the opposite end and the two arms 36 are connected by a rod 37.

By this construction, any downward movement of either rod 33 or 37 will cause an upward movement of the arm 30 and this movement will raise the arm 26 of the bell crank lever, releasing the brake mechanism. The standards 28 are of such a height from the rollers 3 that the rods 33 and 37 are in easy reach of the operator of the machine and are so located that in the event of an operator being caught in the rolls, some portion of his body will strike either one of the rods, stopping the machine.

In the present instance, on one of the standards 28 is a bracket 39 carrying an electric switch 40, the moving part of which is attached to the end of the shaft 29 so that, when the shaft is turned, the switch is thrown in order to break the current leading to the motor 11. The electric switch may be connected in series with a no-voltage release, a starting compensator, or oil switch, which disconnects the current from the motor. This mechanism is not shown in the drawings.

Figure 2:
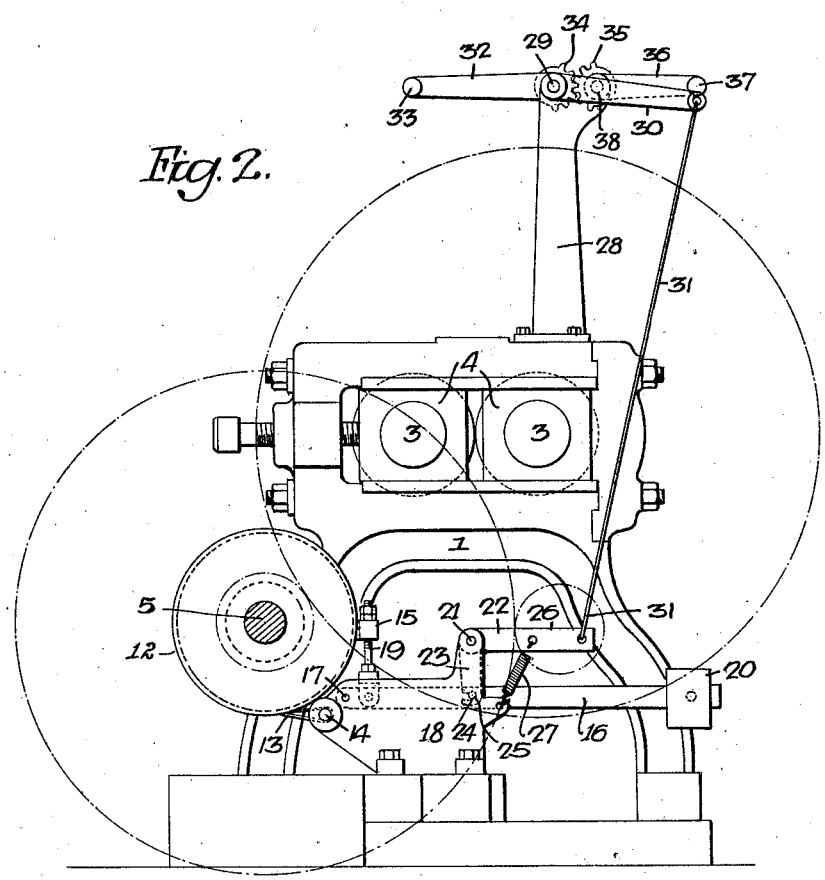
Fig. 2 is an end view.
Figure 4:
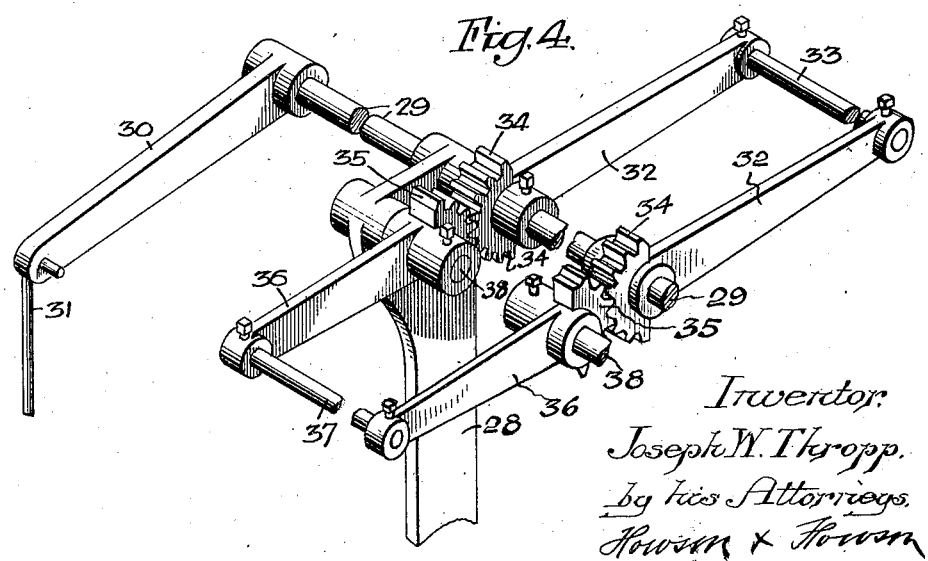
Fig. 4 is a detached sectional perspective view, showing the overhead levers.

In Figs. 1 and 2, I have illustrated my improved stop as applied to a single machine, but where there are a series of machines, as in Fig. 5, which are driven from a single motor, I extend the shaft 41 over the entire series of machines and connect an electric switch 40ª to this shaft, which controls the motor 11ª. On this shaft is an arm 30ª, which is connected to the mechanism which actuates the brake band 13ª on the brake drum 12ª, which is secured to the shaft 5ª. This shaft 5ª is geared to a shaft 42 extending past the several machines. This shaft 42 is geared to the rolls of the several machines A, B and C, in the present instance. The shaft 41 has arms 30ᵇ, which are connected by rods to levers on the shaft 29ª of the safety stop of each machine.

By this construction, if any one of these safety stops is actuated the current from the main motor is immediately cut off and the brake will be applied, instantly stopping the entire series of machines.

It will be understood that in some instances it will only be necessary to have a single trip bar, instead of two, as shown in the drawings. This will depend upon the type of machine to which the invention is applied.

The trip mechanism may be located at a point other than that illustrated in the drawings without departing from the essential features of the invention.

I claim:

1. The combination of a machine having a pair of rolls; standards mounted on the machine; two safety bars; a shaft connected to both bars, said shaft being directly connected to one of said bars and geared to the other bar so that on the downward movement of either bar the shaft will be turned in one direction; an arm on the shaft; brake mechanism; and a trip for said brake mechanism connected to said arm so that when either safety bar is moved downwards the brake will be applied.

2. The combination of a machine having two rolls; standards mounted on the machine; a safety shaft extending from one standard to the other; an electric switch coupled to said shaft; a motor for driving said machine controlled by said switch; a brake on the shaft between the motor and the machine; mechanism for applying the brake; trip mechanism for holding the brake applying mechanism out of action; and means connecting the shaft with the brake applying means so that when the safety shaft is actuated the brakes will be applied and the switch will cut off the current from the machine.

3. The combination in a safety device adapted to be located in close proximity to a machine, of a shaft having two arms; a rod connecting the arms; a toothed segment on said shaft; a second pair of arms; a rod connecting the said arms; a toothed segment geared with the first mentioned segment so that when either rod is moved downwards the shaft will be moved in one direction; an arm on said shaft; brake mechanism; and means for releasing said brake mechanism connected to said last mentioned arm so that when the rod is moved downwards the brake will be applied.

4. The combination of a machine; standards on the machine; a safety shaft carried by the standards; a switch connected to said shaft; a motor for driving the machine controlled by the switch; an arm on the shaft; a bell crank lever connected to the arm, one arm of said bell crank lever being notched; a shaft between the motor and the machine; a brake drum on the shaft; a brake band on the drum; a weighted lever attached to one end of the brake band and having a pin entering the slot in the arm of the bell crank lever; and means for turning the safety shaft, whereby the switch is operated to cut out the motor and the weighted lever is released to apply the brakes to stop the machine.

5. The combination in a safety stop for a machine; of standards in said machine; a shaft extending across the machine and adapted to bearings in the standards, said shaft having an arm; brake mechanism for stopping the machine connected to the arm; two arms on the transverse shaft; a safety rod extending from one arm to the other; two short shafts, one mounted in each standard; an arm on each short shaft; a safety rod connecting the two arms; a segment on one of the said arms; and a segment on the transverse shaft, the two segments intermeshing so that when either of the safety rods is moved in one direction the brake will be applied.

JOSEPH W. THROPP.